US012694134B2

(12) United States Patent
Paliwal et al.

(10) Patent No.: US 12,694,134 B2
(45) Date of Patent: Jul. 28, 2026

(54) SYSTEM, METHOD AND APPARATUS FOR REDUCING LATENCY OF RECEIVER OPERATIONS DURING A CONTAINMENT MODE OF OPERATION

(71) Applicant: Intel Corporation, Santa Clara, CA (US)

(72) Inventors: Nitish Paliwal, Hillsboro, OR (US); Binal Nasit, Cumming, GA (US); Peeyush Purohit, Portland, OR (US); Kirk S. Yap, Westborough, MA (US); Raghunandan Makaram, Northborough, MA (US); Robert G. Blankenship, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/954,419

(22) Filed: Sep. 28, 2022

(65) Prior Publication Data

US 2023/0020359 A1     Jan. 19, 2023

(51) Int. Cl.
*G06F 21/60* (2013.01)
*G06F 21/62* (2013.01)
*G06F 21/85* (2013.01)

(52) U.S. Cl.
CPC ........ *G06F 21/602* (2013.01); *G06F 21/6209* (2013.01); *G06F 21/85* (2013.01)

(58) Field of Classification Search
CPC .... G06F 21/602; G06F 21/6209; G06F 21/85; G06F 21/606
See application file for complete search history.

(56) References Cited

U.S. PATENT DOCUMENTS

| | | | | |
|---|---|---|---|---|
| 5,659,635 A * | 8/1997 | Komatsu | ................. | G06T 9/005 |
| | | | | 358/448 |
| 6,055,502 A * | 4/2000 | Kitamura | ................. | G10H 1/46 |
| | | | | 704/500 |
| 6,606,328 B1 * | 8/2003 | Susnow | ................ | H03M 5/145 |
| | | | | 370/465 |
| 7,593,433 B1 * | 9/2009 | Wu | ..................... | H04L 12/6418 |
| | | | | 370/537 |
| 8,209,550 B2 * | 6/2012 | Gehrmann | .............. | G06F 21/71 |
| | | | | 713/193 |
| 8,947,270 B2 * | 2/2015 | Gopal | ................. | H03M 7/3086 |
| | | | | 382/233 |
| 9,059,729 B1 * | 6/2015 | Wu | ..................... | H03M 7/6064 |
| 9,419,647 B2 * | 8/2016 | Gopal | ................. | H03M 7/6011 |
| 9,473,168 B1 * | 10/2016 | Gopal | ................. | H03M 7/3086 |
| 9,524,169 B2 * | 12/2016 | Gopal | ................. | H03M 7/6005 |

(Continued)

OTHER PUBLICATIONS

Compute Express Link Consortium, "Compute Express Link, Specification, Aug. 2022, Revision: 3.0" Aug. 2022, 911 pages.

*Primary Examiner* — J. Brant Murphy
(74) *Attorney, Agent, or Firm* — Gray Ice Higdon, PLLC

(57) ABSTRACT

In one embodiment, an apparatus includes: a control circuit to receive a message authentication code (MAC) for an epoch comprising a plurality of flits; a calculation circuit to calculate a computed MAC for the epoch; a cryptographic circuit to receive the epoch via a link and decrypt the plurality of flits, prior to authentication of the epoch; and at least one memory to store messages of the decrypted plurality of flits, prior to the authentication of the epoch. Other embodiments are described and claimed.

20 Claims, 6 Drawing Sheets

(56)     References Cited

U.S. PATENT DOCUMENTS

| 11,108,406 | B2 * | 8/2021 | Peffers | ................ | H03M 7/6029 |
| 11,294,850 | B2 | 4/2022 | Ganesh et al. | | |
| 2005/0223222 | A1 * | 10/2005 | Graves | ................. | H04L 9/0894 |
| | | | | | 713/165 |
| 2012/0022861 | A1 * | 1/2012 | Imthurn | ................ | H04N 19/46 |
| | | | | | 704/229 |
| 2012/0182163 | A1 * | 7/2012 | Cho | ........................ | H03M 7/30 |
| | | | | | 341/87 |
| 2013/0007346 | A1 * | 1/2013 | Khan | ................. | H03M 7/3071 |
| | | | | | 711/E12.008 |
| 2014/0006536 | A1 * | 1/2014 | Guilford | ............ | H03M 7/3068 |
| | | | | | 709/212 |
| 2014/0223030 | A1 * | 8/2014 | Bhaskar | .............. | H03M 7/3088 |
| | | | | | 709/247 |
| 2015/0371417 | A1 * | 12/2015 | Angelov | ............. | G06Q 10/101 |
| | | | | | 345/442 |
| 2017/0012641 | A1 * | 1/2017 | Lee | ........................ | H03M 7/30 |
| 2017/0250708 | A1 * | 8/2017 | Blaettler | ............ | H03M 7/3088 |
| 2018/0213231 | A1 * | 7/2018 | Park | ....................... | H04N 19/91 |
| 2019/0087979 | A1 * | 3/2019 | Mammou | ............ | H04N 19/597 |
| 2019/0123763 | A1 * | 4/2019 | Bissessur | ......... | G06F 16/24568 |
| 2019/0207744 | A1 * | 7/2019 | Reinhardt | .............. | H04L 12/40 |
| 2019/0227765 | A1 * | 7/2019 | Soifer | .................... | G06F 9/547 |
| 2019/0227979 | A1 * | 7/2019 | Ganesh | .............. | G06F 15/7825 |
| 2019/0305797 | A1 * | 10/2019 | Peffers | ................ | H03M 7/6029 |
| 2019/0384733 | A1 * | 12/2019 | Jen | ........................ | G06F 1/3206 |
| 2021/0089388 | A1 * | 3/2021 | Makaram | ............. | H04L 9/3242 |

* cited by examiner

SYSTEM, METHOD AND APPARATUS FOR REDUCING LATENCY OF RECEIVER OPERATIONS DURING A CONTAINMENT MODE OF OPERATION

BACKGROUND

There are many different interconnect protocols by which communications between devices occur. One example protocol is a Compute Express Link (CXL) protocol, a current version of which is included in the CXL Specification 3.0 (August 2022). A CXL link provides for communication of multiple information types via a common link. According to a CXL protocol, link-level Integrity and Data Encryption (IDE) is used to provide confidentiality, integrity and replay protection for data communications.

A link layer can use an Advanced Encryption Standard (AES) Galois Counter Mode (GCM) IDE mechanism to provide encryption and authentication capabilities. A Message Authentication Code (MAC) epoch is defined as a set of consecutive flits that are authenticated by a unique MAC value. In a containment mode of operation, a receiver does not release for consumption flits in a MAC epoch unless an integrity check for that epoch passes, with the goal that unauthenticated messages do not make their way downstream. However, this flit-level authentication mechanism adds extra latency, which may not be desirable for sensitive traffic such as memory loads.

DETAILED DESCRIPTION

In various embodiments, a receiver is configured to perform a per-message authentication technique that reduces message transfer latency, and reduces area and power consumption while remaining compliant with IDE protections. More specifically, in an implementation in accordance with a CXL specification, protections of a containment mode remain in effect while performing a flit-based authentication technique with reduced latency. To this end, embodiments may maintain MAC epochs on a per-message basis (or a group of messages) that enables a receiver to reduce latency.

This is so, as during a containment mode of operation (which may be used during CXL.cache memory IDE operation), there is a fixed latency cost associated with checking a MAC value before allowing flits to make progress. With embodiments, a round trip latency savings, e.g., of 2-3 nanoseconds (ns), may be realized. In addition, a header portion of a flit is only decoded a single time, instead of multiple times in a conventional containment mode implementation.

Without the techniques described herein, a no-skid buffer is included in a receiver and suffers a size that is sufficiently large to allocate enough number of flits without being overwritten by an incoming unauthenticated flit before the earliest unauthenticated flit has passed the integrity check. As an example, assume an epoch is formed of 5 flits (when in a 68 Byte flit mode). Also understand that each flit may include a plurality of independent messages, which may be directed to different destinations. In this example, the required no-skid buffer would be on the order of 640 bytes (5120 bits), which would require a latency penalty of 1 write-clock cycle for writing data and 1 read-clock cycle for reading data, respectively, in addition to further latency delays.

Figure 1:
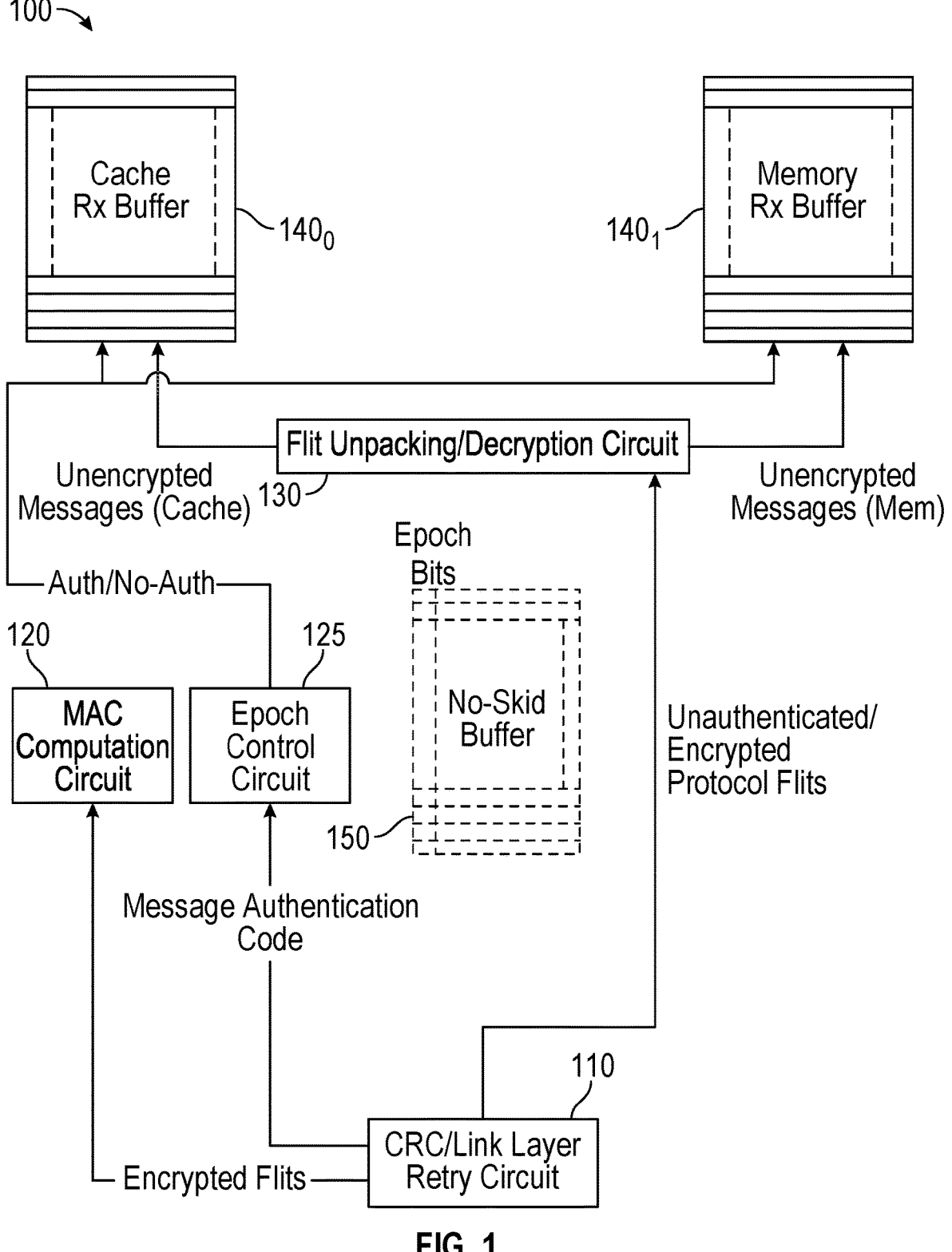
FIG. 1 is a block diagram of a receiver in accordance with an embodiment.

Referring now to FIG. 1, shown is a block diagram of a receiver in accordance with an embodiment. More particularly, in the high level view of FIG. 1, only components within a link layer of receiver 100 are shown so as not to obscure the discussion. As shown in FIG. 1, a receiver 100 receives incoming messages, e.g., in the form of protocol flits, from a device to which it is coupled via a link. Although embodiments herein are described with respect to a CXL link and a CXL communication protocol, embodiments are not so limited.

With an implementation as in FIG. 1, no unauthenticated messages are allowed to proceed downstream, while at the same time, latency and area are reduced.

Understand that receiver 100 is part of a device that includes processing circuitry, memory, and other components. Receiver 100 itself includes a physical layer that receives incoming communications from a link and performs electrical processing, to result in the received flits (containing confidential data) that are provided to the link layer. In turn, the link layer couples to a protocol layer, which further processes messages before sending them to a given destination such as one or more processing circuits, memory, or so forth.

As illustrated, incoming information is received in a cyclic redundancy check (CRC)/retry circuit 110, which may perform CRC computations to confirm whether received flits are correctly received. If not, a retry mechanism may be invoked. When it is determined that a flit is correctly received (which for purposes of discussion herein is assumed to be an encrypted flit), it is provided in parallel both to MAC computation circuit 120 and an unpacking/cryptographic circuit 130 (referred to herein as a "cryptographic circuit").

MAC computation circuit 120 is configured to calculate a computed MAC value for an epoch formed of a plurality of flits. In parallel with this MAC computation, which cannot occur until all flits of an epoch are received, circuit 130 may perform flit unpacking and decryption of the flits to obtain decrypted flits. Understand that at this point, the decrypted flits remain unauthenticated, and are committed to a selected one of receive buffers $140_{0,1}$; however, these unauthenticated messages are not yet allowed to be sent downstream. Although only two such buffers are shown in FIG. 1 (a CXL.cache buffer $140_0$ and a CXL.memory buffer $140_1$), understand that additional receive buffers may be present in other embodiments. Furthermore, it is possible for there to be a single receive buffer to which flits of varying types may be directed.

With embodiments herein, receive buffers 140 are prevented from sending any decrypted flits downstream until it is determined that the flits are part of an authenticated epoch. To this end, at a later time, e.g., during communication of a later flit, a MAC for the prior epoch is received and is directed to epoch control circuit 125. Epoch control circuit 125 may compare this received MAC with the computed MAC value generated in MAC computation circuit 120.

When it is determined that the values match, epoch control circuit 125 issues a control signal or other indication to receive buffers 140 to indicate the messages of the flits of the epoch are authenticated, thus enabling receive buffers 140 to send to target downstream components the messages of the decrypted flits associated with that epoch. Instead if epoch control circuit 125 determines that the MAC values do not match, indicating a lack of authentication, epoch control circuit 125 sends a no authentication signal to receive buffers 140. Epoch control circuit 125 may also raise a MAC authentication failure, which may lead to a fatal failure. In response to receiving this no authentication indication, receive buffers 140 may drop the flits of the offending epoch.

Flit unpacking circuit 130 may associate epoch tracking bits or other indicators as metadata in tandem with individual messages (for storage in corresponding entries of receive buffers 140). In this way, each protocol message as stored in an impendent entry of receive buffer 140 may be associated with a MAC epoch, as opposed to each flit. Then sometime later a MAC value for a given epoch is received, embedded in a flit that does not belong to the current epoch. When control circuit 125 determines that the incoming MAC value matches the computed MAC value, it allows/authenticates the individual messages within receive buffers 140. Once authenticated, cache and memory messages are then allowed to be sent downstream. Using techniques as described herein, flit-level authentication is avoided in favor of message-level authentication, while still preserving the original containment mode goal of ensuring that unauthenticated data is not allowed to be forwarded downstream.

Although not shown in FIG. 1, understand that receiver 100 may include or be coupled to configuration circuitry to configure it for operation in a containment mode (or a non-containment mode), as well as performing additional configuration operations. To this end, this circuitry may include a configuration register. This register may include a field to store an indicator, which when of a first value, causes configuration into the containment mode. In this containment mode, control circuit 125 causes receive buffers 140 to hold messages of decrypted flits until an epoch of which the flits are included is authenticated. Instead when the field stores the indicator having a second value, control circuit 125 enables receive buffers 140 to output the messages without first authenticating the epoch. In a CXL implementation, this configuration register may be a CXL link encryption configuration register that may be read/written by given software (e.g., an operating system and/or application).

As further shown in FIG. 1 in this implementation, there is no need for a no-skid buffer (identified in dashed lines with reference numeral 150). Thus the silicon area required for such buffer can be avoided. Other latency benefits result, including avoiding a latency penalty (e.g., of 1 ns read clock latency) introduced by such no-skid buffer. For a pair of transceivers, this adds up to 2 ns of idle and loaded latency savings, which may improve performance, particularly for latency sensitive channels such as master to subordinate (M2S) requests and data responses. In addition, certain operations such as duplicate header decodings can be avoided. Thus with an implementation that associates individual protocol messages with a given MAC epoch, there is no need for an intermediate buffer, e.g., no-skid buffer 150, in front of flit unpacking circuit 130. Understand while shown at this high level in the embodiment of FIG. 1, many variations and alternatives are possible.

Figure 2:
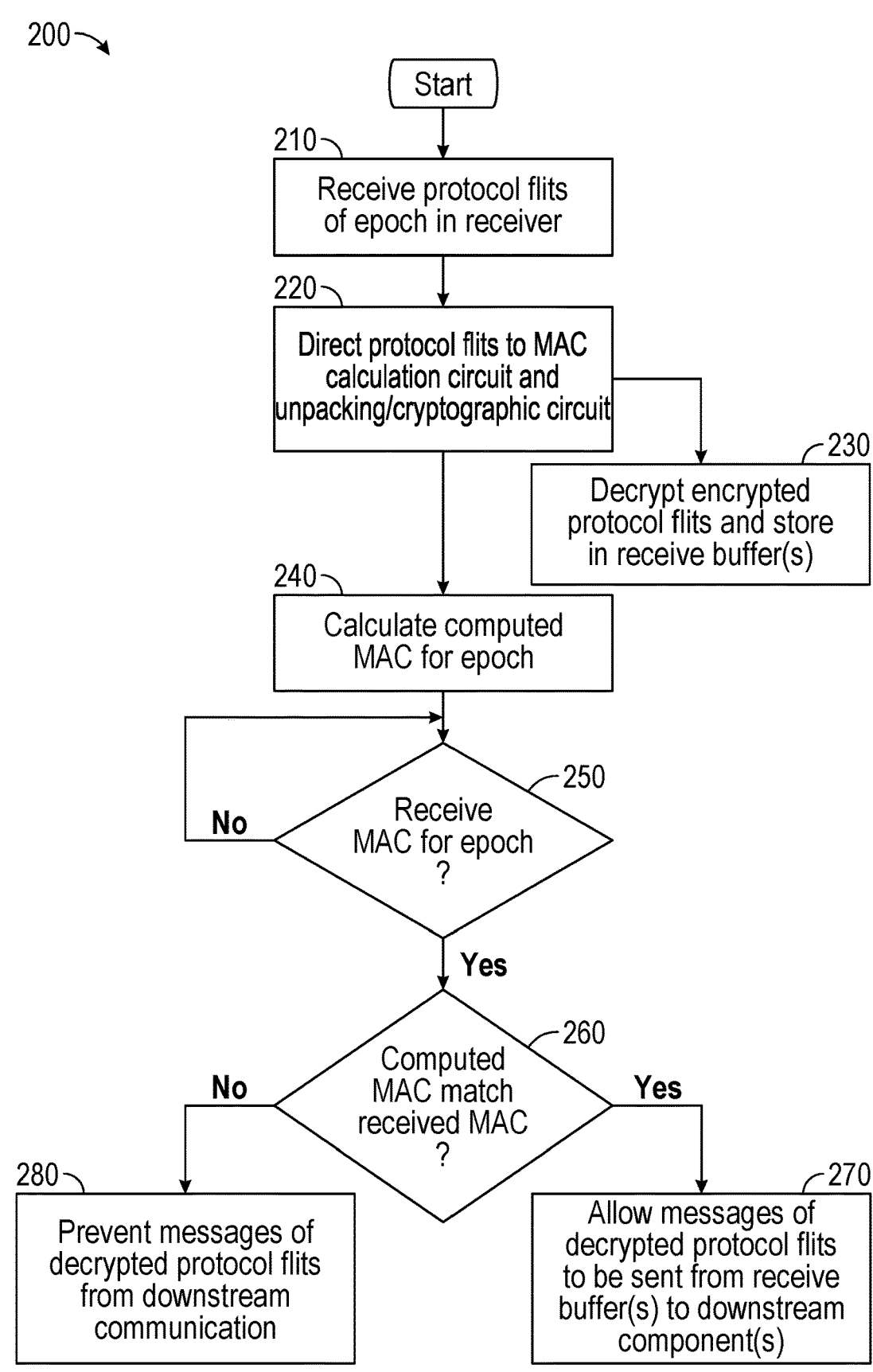
FIG. 2 is a flow diagram of a method in accordance with an embodiment.

Referring now to FIG. 2, shown is a flow diagram of a method in accordance with an embodiment. More specifically, method 200 is a method for processing incoming flits received in link layer circuitry of a receiver. As such, method 200 may be performed, at least in part, by circuitry present in the receiver, and may be performed by hardware circuitry alone, or in combination with firmware and/or software.

As shown in FIG. 2, method 200 begins by receiving protocol flits of an epoch in a receiver (block 210). Control next passes to block 220 where the protocol flits are directed to a MAC calculation circuit in parallel with being sent to unpacking/cryptographic circuitry ("cryptographic circuitry"). Following the two paths in FIG. 2, in the cryptographic circuitry, the encrypted protocol flits are decrypted and the individual messages are directed for storage in a receive buffer (block 230). Understand that with each message of the decrypted protocol flit, a tracking indicator or other indicator may be stored to identify the epoch with which the flit is associated, such that on successful authentication the messages of these flits can be more readily identified and sent downstream. While decrypted, understand that the individual messages of the flits stored in corresponding entries in one or more receive buffers are at this point still unauthenticated.

Still with reference to FIG. 2, at block 240 the MAC calculation circuit may calculate a computed MAC for the epoch. Next it is determined whether a received MAC for the epoch is received (as determined at diamond 250). As described, this computed MAC may be received in a later epoch. It is next determined whether the computed MAC matches the received MAC (diamond 260). If so, the messages of the flits of the epoch are individually authenticated. This per message authentication may be confirmed by appropriate signaling to the receive buffers. Thus at block 270 the messages of the decrypted protocol flits stored in the receive buffer(s) are allowed to be sent to downstream components. In one implementation that uses tracking or other indicators, a signal sent from the control circuit may be used as a trigger to allow these messages of the decrypted authenticated flits to be sent downstream.

Instead if it is determined that the computed MAC value does not match the received MAC value, at block 280 the messages of the decrypted protocol flits are not authenticated and are prevented from downstream communication. In different implementations these flits may be dropped and a failure raised to higher level circuitry, or another error handling technique may be used. Understand while shown at this high level in the embodiment of FIG. 2, many variations and alternatives are possible.

Figure 3:
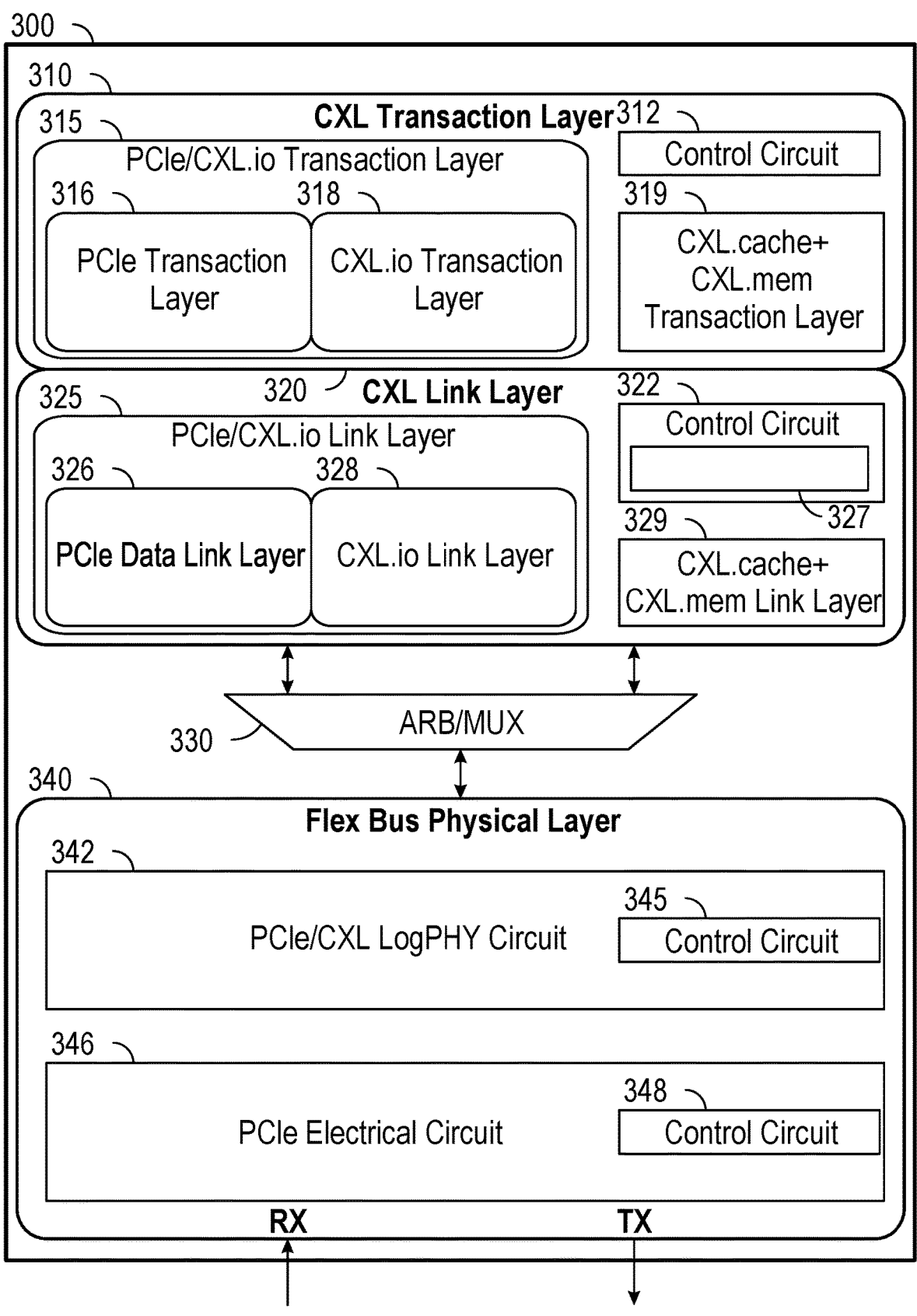
FIG. 3 is a block diagram of an interface circuit in accordance with an embodiment.

Referring now to FIG. 3, shown is a block diagram of an interface circuit in accordance with an embodiment. More specifically as shown in FIG. 3, interface circuit 300 is for interfacing a given device such as an accelerator to a link. In the embodiment shown in FIG. 3, interface circuit 300 is a CXL interface circuit. As shown, CXL interface circuit 300 includes a transaction layer 310, a link layer 320, and a physical layer 340. With reference to CXL transaction layer 310, various components are included to enable transaction layer processing for PCIe/CXL.io communications and CXL.cache and CXL.memory transactions. More particularly, a PCIe/CXL.io transaction layer 1015 includes a control circuit 312, which may perform various transaction layer control operations. In addition, transaction layer 310 further includes a PCIe transaction layer 316 and additional circuitry 318 for handling enhancements to PCIe transaction layer 316 for handling CXL.io transactions. In turn, CXL- .cache and CXL.memory transaction layer 319 may perform transaction layer processing for these protocols.

With reference to CXL link layer 320, various components are included to enable link layer processing for PCIe/CXL.io communications and CXL.cache and CXL.memory transactions. More particularly, a PCIe/CXL.io link layer 325 includes a PCIe data link layer 326 and additional circuitry 328 for handling enhancements to PCIe data link layer 326 for handling CXL.io transactions.

In turn, CXL.cache and CXL.memory link layer 329 may perform link layer processing for these protocols. To this end, a control circuit 322 may configure handling circuitry within link layer 329, including circuitry for performing the containment mode operation as described herein, with the ability to directly store and hold in one or more receive buffers decrypted messages of incoming flits, until a MAC epoch of such flits has been authenticated as described herein. In an embodiment, control circuit 322 may include or be coupled to one or more configuration registers 327. Such configuration registers may include one or more fields including the containment and skid mode fields to control operation as described herein.

With further reference to FIG. 3, link layer 320 is coupled to an arbiter/multiplexer 330 that is to receive incoming data streams from link layer 320 and select a data stream (or portion thereof) for communication to a physical layer 340.

In an embodiment, physical layer 340 may be a physical layer to further process incoming data packets for communication on a physical link, which in an embodiment may be a Flex bus or other CXL link. As illustrated, physical layer 340 includes a PCIe/CXL log PHY logical circuit 342 and a PCIe electrical circuit 346. As seen, these circuits include respective control circuits 345, 348 to control processing within physical layer 340. After all such processing is completed, outgoing transaction layer data packets may be communicated on the link. Similarly, incoming transaction layer data packets may be received within physical layer 340 and processed within the communication stack of interface circuit 300. Note that different configuring of one or more programmable fabrics coupled to interface circuit 300 (and more particularly transaction layer 310) may occur based on a negotiated mode of communication, as described herein. Understand while shown at this high level in the embodiment of FIG. 3, many variations and alternatives are possible.

Figure 4:
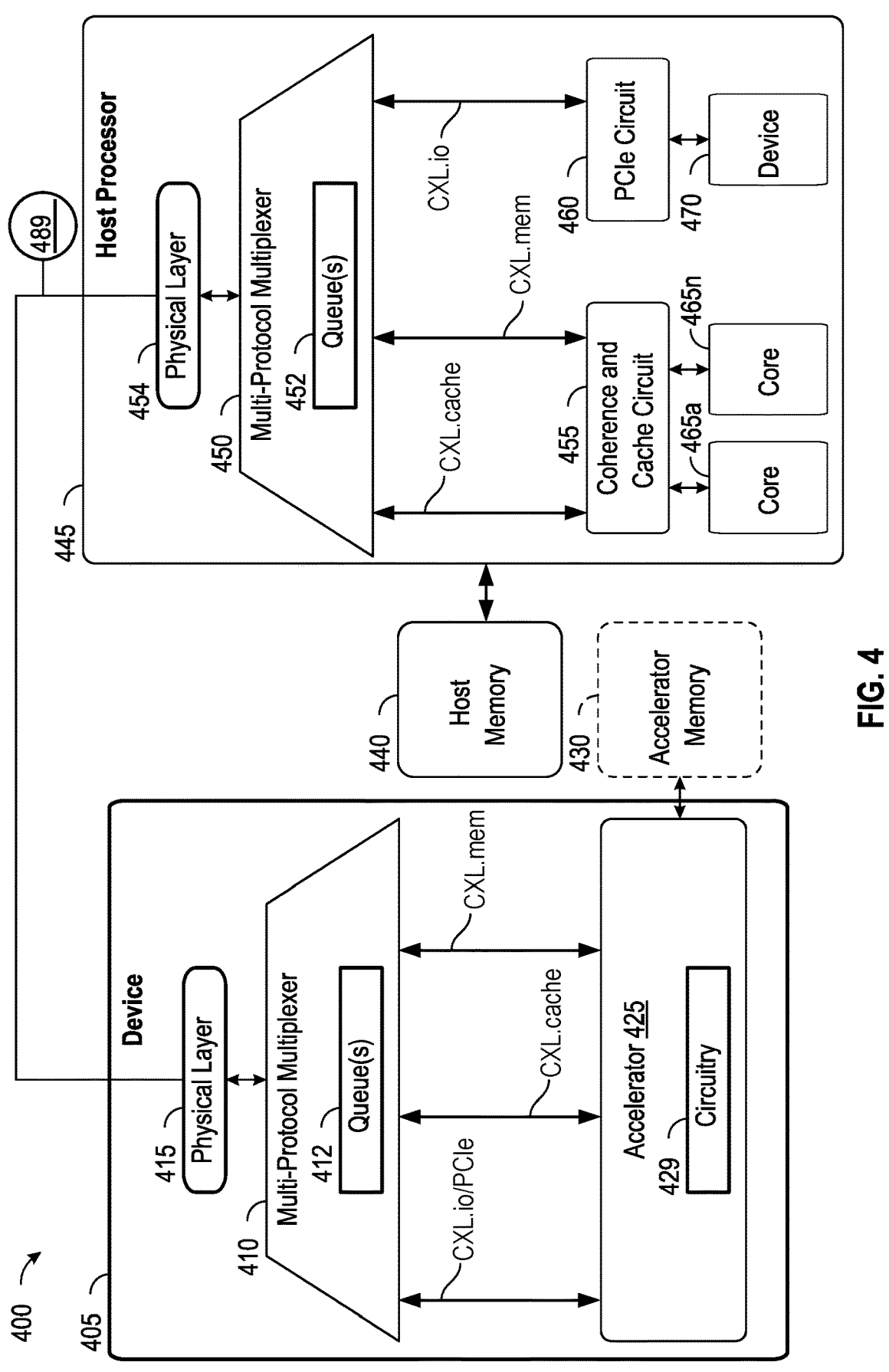
FIG. 4 is a block diagram of a system in accordance with an embodiment.

FIG. 4 is a block diagram of a system in accordance with an embodiment. As shown in FIG. 4 a device 405 may be an accelerator or processor device coupled to a host processor 445 via an interconnect 489, which may be an interconnect, bus, trace, and so forth. Device 405 and host processor 445 may communicate over link 489 to enable data and messages to pass therebetween. In some embodiments, link 489 may be operable to support multiple protocols and communication of data and messages via the multiple interconnect protocols, including a CXL protocol as described herein. For example, link 489 may support various interconnect protocols, including a non-coherent interconnect protocol, a coherent interconnect protocol, and a memory interconnect protocol. Non-limiting examples of supported interconnect protocols may include PCI, PCIe, USB, IDI, IOSF, SMI, SMI3, SATA, CXL.io, CXL.cache, and CXL.mem, and/or the like.

In embodiments, device 405 may include an accelerator 425 including circuitry 429. In some instances, accelerator 425 and circuitry 429 may provide processing and memory capabilities. Examples of device 405 may include producer-consumer devices such as a graphics or other specialized accelerator, producer-consumer plus devices, software-assisted device memory devices, autonomous device memory devices, and giant cache devices. In some cases, accelerator 425 may couple to an optional accelerator memory 430. Accelerator 425 and circuitry 429 may provide the processing and memory capabilities based on the device. For example, accelerator 425 and circuitry 429 may communicate using, for example, a coherent interconnect protocol for various functions, such as coherent requests and memory flows with host processor 445 via interface logic 413 and circuitry 427.

In some embodiments, protocol queue 412 may be protocol specific such that each interconnect protocol may be associated with a particular protocol queue. Multiplexer 410 may also implement arbitration circuitry to arbitrate between communications of different protocols and provide selected communications to a physical layer 415.

In various embodiments, host processor 445 may be a main processor such as a CPU. Host processor 445 may be coupled to a host memory 440 and may include a coherence and cache circuit 455, which may include a cache hierarchy. Circuit 455 may communicate with one or more cores 465$a$-$n$. In some embodiments, circuit 455 may enable communication via one or more of a coherent interconnect protocol (e.g., CXL.cache) and a memory interconnect protocol (e.g., CXL.mem).

In various embodiments, host processor 440 may include a device 470 to communicate with a PCIe circuit 460 over an interconnect. In some embodiments, device 470 may be an I/O device, such as a PCIe I/O device. In other cases, one or more external devices such as PCIe devices may couple to PCIe 470.

In embodiments, host processor 445 may enable multi-protocol communication between the components of host processor 445 and device 405. To this end, as shown in FIG. 4, circuits 455 and 460 (collectively) may communicate any or all of CXL.io/PCIe, CXL.cache, and/or CXL.memory traffic with a multi-protocol multiplexer 450 having one or more protocol queues 452 to send and receive messages and data with device 405.

Protocol queue 452 may be protocol specific such that each interconnect protocol may be associated with a particular protocol queue. Multiplexer 450 may also implement arbitration circuitry to arbitrate between communications of different protocols and provide selected communications to a physical layer 454.

Figure 5:
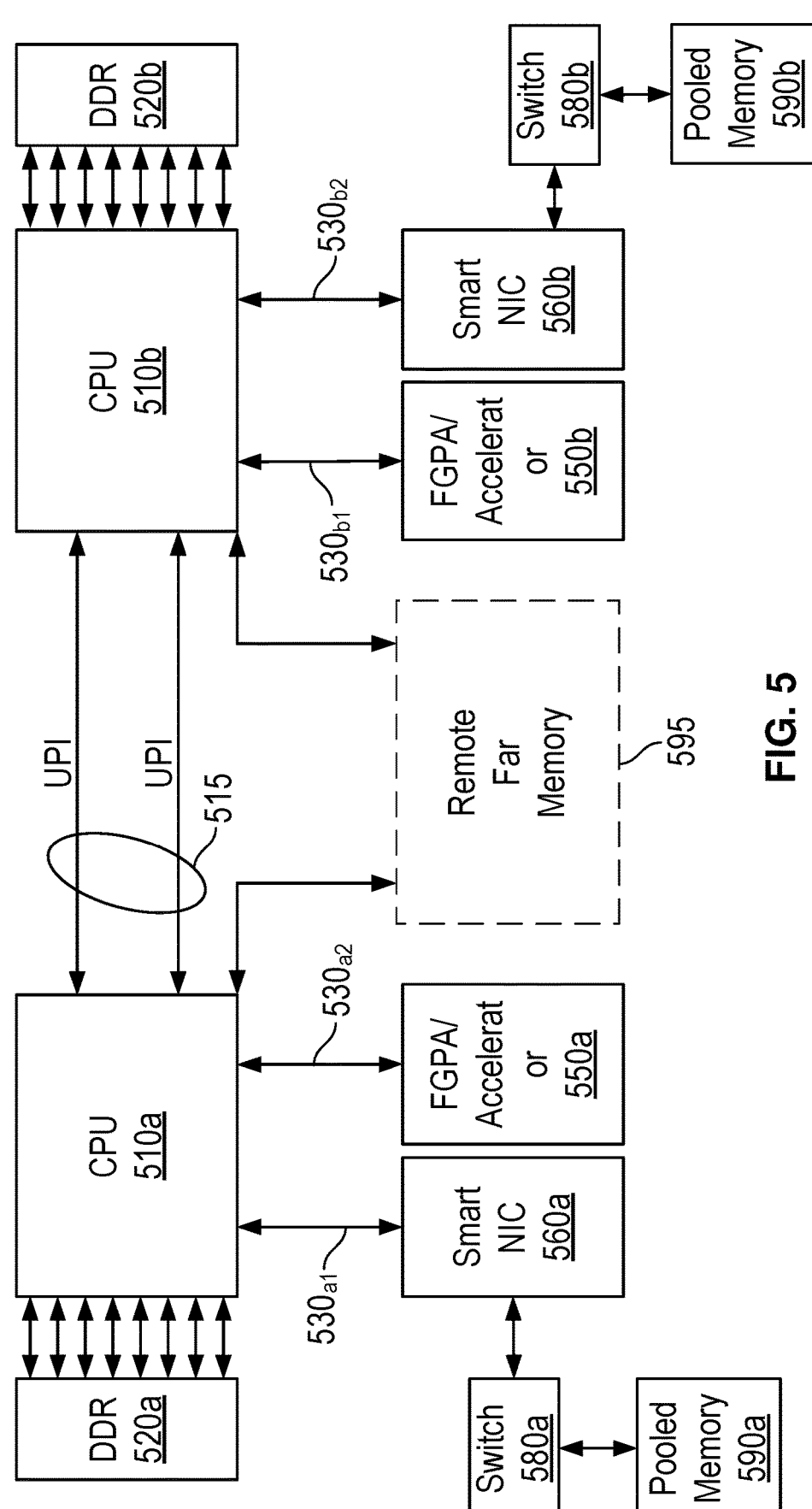
FIG. 5 is a block diagram of a system in accordance with another embodiment.

Referring now to FIG. 5, shown is a block diagram of a system in accordance with another embodiment. As shown in FIG. 5, a system 500 may be any type of computing device, and in one embodiment may be a server system such as an edge platform, where at least certain communication protocols may be configured to operate in a containment mode while reducing latency by allowing decrypted messages to be stored directly into receive buffers (but not sent out until a MAC epoch is authenticated. In the embodiment of FIG. 5, system 500 includes multiple CPUs 510$a$,$b$ that in turn couple to respective system memories 520$a$,$b$ which in embodiments may be implemented as double data rate (DDR) memory. Note that CPUs 510 may couple together via an interconnect system 515 such as an Intel® Ultra Path Interconnect or other processor interconnect technology.

To enable coherent accelerator devices and/or smart adapter devices to couple to CPUs 510 by way of potentially multiple communication protocols, a plurality of interconnects 530$a1$-$b2$ may be present. In an embodiment, each interconnect 530 may be a given instance of a CXL link.

In the embodiment shown, respective CPUs 510 couple to corresponding field programmable gate arrays (FPGAs)/ accelerator devices 550*a,b* (which may include graphics processing units (GPUs) and programmable fabrics as described herein), in one embodiment. In addition CPUs 510 also couple to smart network interface circuit (NIC) devices 560*a,b*. In turn, smart NIC devices 560*a,b* couple to switches 580*a,b* (e.g., CXL switches in accordance with an embodiment) that in turn couple to a pooled memory 590*a,b* such as a persistent memory. As shown information can be stored in a pooled memory 590. In turn, CPUs 510 or other entities may access and further process this information from pooled memory 590. In addition, CPUs 510 may couple to an optional remote far memory 595.

Figure 6:
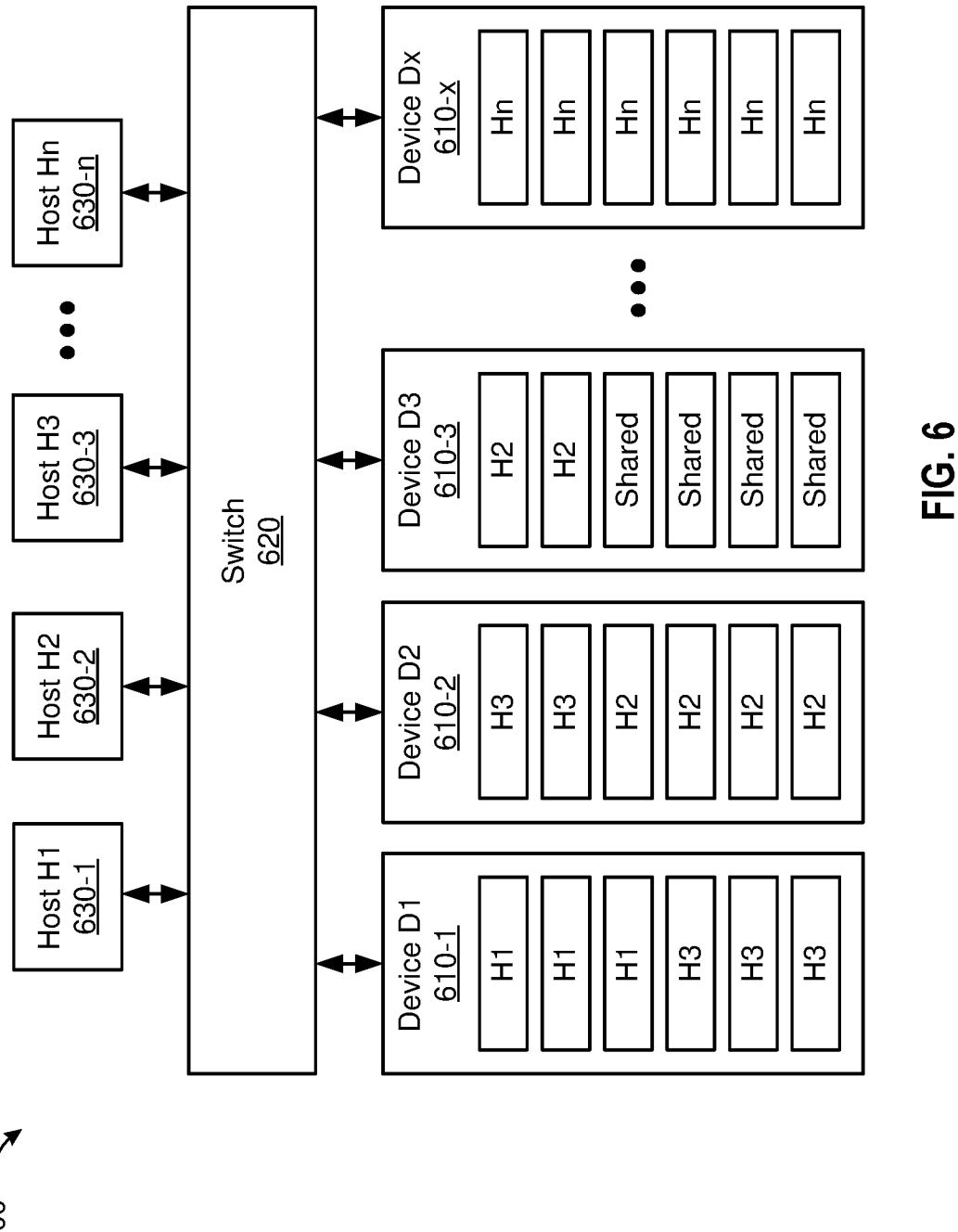
FIG. 6 is a block diagram of another example system in accordance with an embodiment.

Referring now to FIG. 6, shown is a block diagram of another example system in accordance with an embodiment. In FIG. 6, system 600 may be all or part of a rack-based server having multiple hosts in the form of compute drawers that may couple to pooled memory via one or more switches. The various components may be controlled, in some cases to operate in a containment mode with reduced latency as described herein.

As shown, multiple hosts 630-1-*n* (also referred to herein as "hosts 630") are present. Each host may be implemented as a compute drawer having one or more SoCs, memory, storage, interface circuitry and so forth. In one or more embodiments, each host 630 may include one or more virtual hierarchies corresponding to different cache coherence domains. Hosts 630 may couple to a switch 620, which may be implemented as a CXL switch (e.g., a CXL 2.0 (or later) switch). In an embodiment, each host 630 may couple to switch 620 using an off-package interconnect, e.g., a Universal Chiplet Interconnect Express (UCIe) interconnect running a CXL protocol through at least one UCIe retimer (which may be present in one or both of hosts 630 and switch 620).

Switch 620 may couple to multiple devices 610-1-*x* (also referred to herein as "device 610"), each of which may be a memory device (e.g., a Type 3 CXL memory expansion device) and/or an accelerator. In the illustration of FIG. 6, each device 610 is shown as Type 3 memory device having any number of memory regions (e.g., defined partitions, memory ranges, etc.). Depending on configuration and use case, certain devices 610 may include memory regions assigned to particular hosts while others may include at least some memory regions designated as shared memory. Although embodiments are not limited in this regard, the memory included in devices 610 may be implemented with any type(s) of computer memory (e.g., dynamic random-access memory (DRAM), static random-access memory (SRAM), non-volatile memory (NVM), a combination of DRAM and NVM, etc.).

The following examples pertain to further embodiments.

In one example, an apparatus comprises: a control circuit to receive a MAC for an epoch comprising a plurality of flits; a calculation circuit coupled to the control circuit, the calculation circuit to calculate a computed MAC for the epoch; a cryptographic circuit to receive the epoch from a device coupled to the apparatus via a link and decrypt the plurality of flits, prior to authentication of the epoch; and at least one memory to store messages of the decrypted plurality of flits, prior to the authentication of the epoch.

In an example: when the link is configured for a first mode, the control circuit is to cause the at least one memory to hold the messages of the decrypted plurality of flits until the epoch is authenticated; and when the link is configured for a second mode, the control circuit is to allow the at least one memory to output the messages of the decrypted plurality of flits before the epoch is authenticated.

In an example, the control circuit is to authenticate the epoch when the computed MAC matches the MAC, the control circuit to enable the messages of the decrypted plurality of flits to be output from the at least one memory and directed to a downstream component in response to the authentication of the epoch.

In an example, the control circuit is to authenticate the messages of the plurality of flits on a per message basis.

In an example, the control circuit is to prevent the messages of the decrypted plurality of flits from being directed to the downstream component when the epoch is not authenticated.

In an example, the control circuit is to receive the MAC during another epoch following the epoch.

In an example, the apparatus further comprises a CRC circuit, where in response to a valid CRC check for a first flit of the plurality of flits, the CRC circuit is to provide the first flit directly to the cryptographic circuit.

In an example, the cryptographic circuit is to decrypt a first plurality of messages of the first flit and commit each of the decrypted first plurality of messages to a corresponding entry of the at least one memory with an identifier of the epoch to associate the decrypted message with the epoch.

In an example, in response to the authentication of the epoch, the control circuit is to authenticate each of the decrypted first plurality of messages.

In an example, the link comprises a CXL link, and the first mode comprises a containment mode of a CXL IDE protocol.

In an example, the at least one memory comprises: a first buffer to store a first portion of the messages of the decrypted plurality of flits comprising cache messages of a CXL.cache communication protocol; and a second buffer to store a second portion of the messages of the decrypted plurality of flits comprising memory messages of a CXL.memory communication protocol.

In an example, the apparatus further comprises a configuration register having a first indicator, where: when the first indicator has a first value, the control circuit is to cause the at least one memory to hold the messages of the decrypted plurality of flits until the epoch is authenticated; and when the first indicator has a second value, the control circuit is to enable the at least one memory to output the messages of the decrypted plurality of flits without the authentication.

In another example, a method comprises: calculating, in a calculation circuit of a receiver, a computed MAC for an epoch formed of a plurality of flits, where the plurality of flits are encrypted and received in the receiver via a link that couples the receiver with a transmitter; prior to authenticating the epoch, decrypting, in a cryptographic circuit of the receiver, the plurality of flits and storing messages of the decrypted plurality of flits in at least one buffer; and allowing the messages of the plurality of flits to be sent from the at least one buffer to one or more destination components in response to authenticating the epoch.

In an example, the method further comprises preventing the messages of the plurality of flits from being sent to the one or more destination components prior to authenticating the epoch, the authenticating comprising identifying that the computed MAC matches a MAC for the epoch.

In an example, the method further comprises indicating a failure in response to the computed MAC not matching the MAC for the epoch.

In an example, the method further comprises storing the messages of the decrypted plurality of flits in the at least one buffer with a tracking indicator to identify the epoch.

In an example, allowing the messages of the plurality of flits to be sent from the at least one buffer to the one or more destination components comprises outputting the messages of the plurality of flits in response to a signal to indicate the authentication of the epoch.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In another example, a system includes a first device, a second device and a link coupled to the first device and a second device. The first device includes a receiver comprising a physical layer circuit to interface with the link and a link layer circuit coupled to the physical layer circuit. The link layer circuit may include: a control circuit to receive a MAC for an epoch comprising a plurality of flits; a cryptographic circuit to receive the epoch from the second device via the physical layer circuit and decrypt the plurality of flits, prior to authentication of the epoch; and at least one memory to store messages of the decrypted plurality of flits prior to the authentication of the epoch, where in response to the authentication of the epoch based at least in part on the MAC, the control circuit is to enable the at least one memory to output the messages of the decrypted plurality of flits. The receiver may further include a protocol layer circuit coupled to the link layer circuit, the protocol layer circuit to handle the messages of the decrypted plurality of flits. The second device may include a transmitter to transmit the epoch.

In an example, the receiver is to calculate a computed MAC for the epoch, the control circuit to enable the at least one memory to output the messages of the decrypted plurality of flits when the computed MAC matches the MAC.

In an example, the link comprises a CXL link, and where the control circuit is to enable the at least one memory to output the messages of the decrypted plurality of flits, based at least in part on the MAC when the CXL link is configured for a containment mode.

In yet another example, an apparatus comprises: means for calculating a computed MAC for an epoch formed of a plurality of flits received in a receiving means from a transmitting means; means for decrypting, prior to authenticating the epoch, the plurality of flits; means for storing messages of the decrypted plurality of flits; and means for allowing the messages of the plurality of flits to be sent from the means for storing to one or more destination means in response to authenticating the epoch.

In an example, the apparatus further comprises means for preventing the messages of the plurality of flits from being sent to the one or more destination means prior to authenticating the epoch, the authenticating comprising identifying that the computed MAC matches a MAC for the epoch.

In an example, the apparatus further comprises means for indicating a failure in response to the computed MAC not matching the MAC for the epoch.

In an example, the apparatus further comprises means for storing the messages of the decrypted plurality of flits with a tracking indicator to identify the epoch.

In an example, the apparatus further comprises means for outputting the messages of the plurality of flits in response to a signal to indicate the authentication of the epoch.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SOC or other processor, is to configure the SOC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EE-PROMs), magnetic or optical cards, or any other type of media suitable for storing electronic instructions.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:
   a control circuit to receive a message authentication code (MAC) for an epoch comprising a plurality of flits;
   a calculation circuit coupled to the control circuit, the calculation circuit to calculate a computed MAC for the epoch;
   a cryptographic circuit to receive the epoch from a device coupled to the apparatus via a link and decrypt the plurality of flits, prior to authentication of the epoch; and
   at least one memory to store messages of the decrypted plurality of flits, prior to the authentication of the epoch, wherein the cryptographic circuit is to associate an identifier of the epoch as metadata with each individual message of the decrypted plurality of flits stored in the at least one memory.

2. The apparatus of claim 1, wherein:

when the link is configured for a first mode, the control circuit is to cause the at least one memory to hold the messages of the decrypted plurality of flits until the epoch is authenticated; and when the link is configured for a second mode, the control circuit is to allow the at least one memory to output the messages of the decrypted plurality of flits before the epoch is authenticated.

3. The apparatus of claim 2, wherein the control circuit is to authenticate the epoch when the computed MAC matches the MAC, the control circuit to enable the messages of the decrypted plurality of flits to be output from the at least one memory and directed to a downstream component in response to the authentication of the epoch.

4. The apparatus of claim 3, wherein the control circuit is to authenticate the messages of the plurality of flits on a per message basis.

5. The apparatus of claim 3, wherein the control circuit is to prevent the messages of the decrypted plurality of flits from being directed to the downstream component when the epoch is not authenticated.

6. The apparatus of claim 1, wherein the control circuit is to receive the MAC during another epoch following the epoch.

7. The apparatus of claim 1, further comprising a cyclic redundancy check (CRC) circuit, wherein in response to a valid CRC check for a first flit of the plurality of flits, the CRC circuit is to provide the first flit directly to the cryptographic circuit.

8. The apparatus of claim 7, wherein the cryptographic circuit is to decrypt a first plurality of messages of the first flit and commit each of the decrypted first plurality of messages to a corresponding entry of the at least one memory with an identifier of the epoch to associate the decrypted message with the epoch.

9. The apparatus of claim 8, wherein in response to the authentication of the epoch, the control circuit is to authenticate each of the decrypted first plurality of messages.

10. The apparatus of claim 1, wherein the link comprises a Compute Express Link (CXL) link, and the first mode comprises a containment mode of a CXL integrity and data encryption (IDE) protocol.

11. The apparatus of claim 10, wherein the at least one memory comprises:

a first buffer to store a first portion of the messages of the decrypted plurality of flits comprising cache messages of a CXL.cache communication protocol; and a second buffer to store a second portion of the messages of the decrypted plurality of flits comprising memory messages of a CXL.memory communication protocol.

12. The apparatus of claim 1, further comprising a configuration register having a first indicator, wherein:

when the first indicator has a first value, the control circuit is to cause the at least one memory to hold the messages of the decrypted plurality of flits until the epoch is authenticated; and when the first indicator has a second value, the control circuit is to enable the at least one memory to output the messages of the decrypted plurality of flits without the authentication.

13. A method comprising:

calculating, in a calculation circuit of a receiver, a computed message authentication code (MAC) for an epoch formed of a plurality of flits, wherein the plurality of flits are encrypted and received in the receiver via a link that couples the receiver with a transmitter;

prior to authenticating the epoch, decrypting, in a cryptographic circuit of the receiver, the plurality of flits and storing messages of the decrypted plurality of flits in at least one buffer, wherein the cryptographic circuit associates an identifier of the epoch as metadata with each individual message of the decrypted plurality of flits stored in the at least one buffer; and allowing the messages of the decrypted plurality of flits to be sent from the at least one buffer to one or more destination components in response to authenticating the epoch.

14. The method of claim 13, further comprising preventing the messages of the plurality of flits from being sent to the one or more destination components prior to authenticating the epoch, the authenticating comprising identifying that the computed MAC matches a MAC for the epoch.

15. The method of claim 14, further comprising indicating a failure in response to the computed MAC not matching the MAC for the epoch.

16. The method of claim 13, further comprising storing the messages of the decrypted plurality of flits in the at least one buffer with a tracking indicator to identify the epoch.

17. The method of claim 16, wherein allowing the messages of the plurality of flits to be sent from the at least one buffer to the one or more destination components comprises outputting the messages of the plurality of flits in response to a signal to indicate the authentication of the epoch.

18. A system comprising:

a first device comprising a receiver, the receiver comprising:

a physical layer circuit to interface with a link;

a link layer circuit coupled to the physical layer circuit, the link layer circuit comprising:

a control circuit to receive a message authentication code (MAC) for an epoch comprising a plurality of flits;

a cryptographic circuit to receive the epoch from a second device via the physical layer circuit and decrypt the plurality of flits, prior to authentication of the epoch, wherein the cryptographic circuit is to associate an identifier of the epoch as metadata with each individual message of the decrypted plurality of flits; and at least one memory to store messages of the decrypted plurality of flits with the identifier prior to the authentication of the epoch, wherein in response to the authentication of the epoch based at least in part on the MAC, the control circuit is to enable the at least one memory to output the messages of the decrypted plurality of flits; and a protocol layer circuit coupled to the link layer circuit, the protocol layer circuit to handle the messages of the decrypted plurality of flits;

the link coupled to the first device and the second device; and the second device coupled to the link, the second device comprising a transmitter to transmit the epoch.

19. The system of claim 18, wherein the receiver is to calculate a computed MAC for the epoch, the control circuit to enable the at least one memory to output the messages of the decrypted plurality of flits when the computed MAC matches the MAC.

20. The system of claim 18, wherein the link comprises a Compute Express Link (CXL) link, and wherein the control circuit is to enable the at least one memory to output the messages of the decrypted plurality of flits, based at least in part on the MAC when the CXL link is configured for a containment mode.

* * * * *